*(12)* United States Patent
Lawitzky (10) Patent No.: US 11,150,321 B2
(45) Date of Patent: Oct. 19, 2021

(54) SYSTEM FOR ORIENTATION ESTIMATION FROM RADIO MEASUREMENTS

(71) Applicant: Kinexon GmbH, Munich (DE)

(72) Inventor: Martin Lawitzky, Munich (DE)

(73) Assignee: Kinexon GmbH, Munich (DE)

( * ) Notice: Subject to any disclaimer, the term of this patent is extended or adjusted under 35 U.S.C. 154(b) by 359 days.

(21) Appl. No.: 16/274,051

(22) Filed: Feb. 12, 2019

(65) Prior Publication Data

US 2019/0250242 A1    Aug. 15, 2019

(30) Foreign Application Priority Data

Feb. 15, 2018   (EP) ..................................... 18156971

(51) Int. Cl.
*G01S 5/02*      (2010.01)
(52) U.S. Cl.
CPC .............. *G01S 5/0247* (2013.01); *G01S 5/02* (2013.01); *G01S 5/0221* (2013.01); *G01S 5/0226* (2013.01); *G01S 5/0294* (2013.01)
(58) Field of Classification Search
CPC ........ G01S 5/0247; G01S 5/02; G01S 5/0221; G01S 5/0226; G01S 5/0294; G01S 5/14; G01S 13/878; H04W 64/00
USPC ....................................................... 342/463
See application file for complete search history.

(56) References Cited

U.S. PATENT DOCUMENTS

| 9,590,298 | B1 * | 3/2017 | Buchmueller | ............ H01Q 1/28 |
| 2002/0149519 | A1 * | 10/2002 | Varadan | .................... H01Q 9/40 |
| | | | | 343/700 MS |
| 2008/0204699 | A1 * | 8/2008 | Benz | .................... G01C 15/002 |
| | | | | 356/4.01 |
| 2013/0207845 | A1 | 8/2013 | Eidloth et al. | |
| 2018/0182173 | A1 * | 6/2018 | Robaina | ............... G02B 6/0068 |
| 2018/0340804 | A1 * | 11/2018 | Cherkashin | ............ G01D 18/00 |

FOREIGN PATENT DOCUMENTS

| EP | 1143263 | 10/2001 |
| WO | WO 2013/102154 | 7/2013 |
| WO | WO 2017/203209 | 11/2017 |

OTHER PUBLICATIONS

European Search Report dated Aug. 29, 2018, from European Patent Application No. 18156971.6, 9 pp.

* cited by examiner

*Primary Examiner* — Harry K Liu
(74) *Attorney, Agent, or Firm* — Klarquist Sparkman, LLP (57) ABSTRACT

A radio localization system and a method for determining an orientation of an object are disclosed. The radio localization system comprises a first transceiver configured for being attached to an object and one or more second transceivers. The first transceiver is configured for measuring one or more characteristics of a radio signal received from a second transceiver and/or the one or more second transceivers are configured for measuring one or more characteristics of a radio signal received from the first transceiver. Furthermore, the radio localization system comprises processing means configured for determining an orientation of the object based on a radiation pattern and/or a spatial absorption pattern associated with the first transceiver as attached to the object, and one or more measured characteristics of one or more received radio signals.

20 Claims, 4 Drawing Sheets

SYSTEM FOR ORIENTATION ESTIMATION FROM RADIO MEASUREMENTS

CROSS REFERENCE TO RELATED APPLICATION

This application claims priority from European Patent Application No. 18156971.6, filed Feb. 15, 2018, the disclosure of which is hereby incorporated by reference.

FIELD OF THE INVENTION

The present invention relates to a system and method for estimating the orientation of an object and, more specifically, to a system for and method of determining the orientation of an object from radio measurements.

BACKGROUND OF THE INVENTION

Several positioning systems to determine the position of an object are known in the art. The most famous positioning system is the Global Positioning System (GPS), which provides geolocation and time information to a GPS receiver anywhere on Earth where there is an unobstructed line of sight to four or more GPS satellites. However, the GPS is generally not suitable to determine indoor locations, since microwaves will be attenuated and scattered by roofs, walls and other objects, and its spatial resolution is insufficient for many applications.

Other conventional systems are utilized to determine the position of objects or people inside a building. Such systems are called indoor positioning systems (IPS). IPSs may use radio waves, magnetic fields, acoustic signals, or other sensory information collected by devices to locate objects or people, by utilizing a range of technologies, including distance measurement to nearby anchors or anchor nodes (nodes with known positions, e.g. Wi-Fi access points), magnetic positioning, dead reckoning, etc. They either actively locate mobile devices or tags or provide ambient location or environmental context in order for devices to be sensed.

Various applications of real-time localization systems benefit from obtaining information on the pose or orientation of an object in addition to just the position. However, conventional object tracking systems have problems in determining the orientation of an object in a reliable and efficient manner. Typically, state-of-the-art solutions rely on additional sensors, such as magnetometers, Inertial Measurement Units (IMUs) or multi-tag configurations. One example is described in US 2016/0238690 A1, which discloses a method for indoor localization of a user equipped with a localization device having electromagnetic signal receiver means and means for detecting the orientation in a predetermined spatial reference system. However, the orientation is detected by utilizing IMUs as orientation means, such as a gyroscope, an accelerometer and a compass. Additional senso or multi-tag configurations to determine the pose or orientation of an object, though, increase the complexity and costs with each additional sensor or tag required for the orientation determination.

Another problem with some of the sensors used in the prior art is that they do not provide for absolute pose estimation, but only for relative determination of acceleration and hence orientation. Some internal sensors, like IMUs, "drift" and do not provide for a reliable determination of the orientation over a certain time period. For example, US 2011/0025562 A1 discloses a six-degree-of-freedom (6DOF) tracking system that adapts aspects of Ultra-Wideband (UWB) measurement and micro-electromechanical systems (MEMS) inertial measurements within a tightly coupled fusion algorithm to measure an object's position as well as orientation. However, this requires regular accelerations of the object to determine the pose of the object, which does not provide for a reliable determination of the orientation in case of the absence of regular accelerations of the object.

It is the object of the present invention to provide an improved system for determining an orientation of an object within radio localization applications.

This object is solved by the subject matter of the independent claims.

Embodiments are defined by the dependent claims.

The present invention provides an improved radio localization system for determining an orientation of an object. The radio localization system, which preferably operates in real-time, comprises a first transceiver which is configured for being attached to an object. The radio localization system further comprises one or more second transceivers defining a localization grid with reference positions. The first transceiver and/or the one or more second transceivers are configured for emitting a radio signal. Further, the first transceiver is configured for measuring one or more characteristics of a radio signal received from a second transceiver and/or the one or more second transceivers are configured for measuring one or more characteristics of a radio signal received from the first transceiver. The radio localization system also comprises processing means configured to determine an orientation of the object based on a radiation pattern and/or a spatial absorption pattern associated with the first transceiver as attached to the object, and the one or more measured characteristics of one or more of the received radio signals.

Further, the present invention provides an improved method for determining an orientation of an object. The method comprises receiving, by a first transceiver, a radio signal emitted from a second transceiver of one or more second transceivers and/or receiving, by a second transceiver of the one or more second transceivers, a radio signal emitted from the first transceiver. The one or more second transceivers define a localization grid with reference positions and the first transceiver is attached to an object. The method further comprises measuring one or more characteristics of the received radio signal. Moreover, the method comprises determining an orientation of the object based on a radiation pattern and/or a spatial absorption pattern associated with the first transceiver as attached to the object, and the one or more measured characteristics of the received radio signal.

The present invention provides for several advantages over prior art systems. For example, pure radiolocation measurements without additional sensors to determine the orientation of an object may reduce the costs of a system. In particular, the present invention allows using the same system being used for localization of an object also for determining the orientation of the object. Compared to conventional systems utilizing additional sensors to detect the orientation of an object, this saves space, allowing for increased miniaturization of (transmitter/receiver) tags, and costs. The present invention allows for a light weight tag, without the need of additional sensors on the object. In particular, in the field of sports, it is desirable to have light weight tags, so that these tags do not have an influence on the performance of a player or other tagged objects. One aspect of the present invention is the significantly lower complexity compared to systems with additional sensors or systems requiring a plurality of tags to detect the orientation of an object.

Compared to conventional tracking systems that determine the orientation of an object based on the path of the object, the present invention provides for an improved radio localization system that may determine the orientation of an object independent of previously detected measurement points. For example, if a hockey, soccer or football player is moving backwards, a tracking system determining the orientation based on the path of the player would determine a wrong orientation, in contrast to the present invention. Accordingly, the present invention provides an improved localization system for determining the orientation of an object in a reliable, fast and precise manner.

According to an embodiment of the present invention, the processing means may be configured to determine the orientation of the object by comparing values corresponding to an assumed orientation of the object with values corresponding to the one or more measured characteristics. According to an embodiment, the radiation pattern may be a known radiation pattern and the spatial absorption pattern may be a known anisotropic spatial absorption pattern. The radiation pattern and/or the spatial absorption pattern may be determined by at least one of an estimate, a simulation of a radio signal emitted by the first transceiver as attached to the object, a calibration of the first transceiver as attached to the object, a calibration of the one or more second transceivers, by measuring one or more characteristics of radio signals received from the first transceiver at known positions and orientations of the first transceiver as attached to the object, and a measurement of one or more radio signals emitted or received by the first transceiver as attached to the object. In embodiments, the processing means may be configured for determining the orientation of the object by comparing a first set of values with a second set of values, the first set of values being determined from at least the one or more measured characteristics, and the second set of values being determined from at least the radiation pattern having a known or estimated radiation characteristic and/or from at least the spatial absorption pattern having a known or estimated absorption characteristic. At least one value of the first set of values and the second set of values may be extrapolated and/or interpolated for the comparison. Further, the second set of values may be varied by rotating/varying an orientation of the radiation pattern and/or by rotating/varying an orientation of the spatial absorption pattern until the first set of values best matches the second set of values.

One aspect of the present invention is to advantageously use a known, determined, measured or estimated anisotropic radiation pattern and/or a spatial absorption pattern to roughly or precisely determine an orientation of an object. Typically, prior art systems try to achieve isotropic, point-symmetric radiation to reach as many anchors or detectors as possible. However, the present invention advantageously utilizes the natural and/or artificial anisotropic, non-point-symmetric radiation pattern emitted from the first transceiver on the object to determine an orientation of the object in a precise manner purely from the emitted radio signal. Alternatively or additionally, a known anisotropic absorption pattern can be utilized to precisely determine an orientation of an object, since then at least the signal strength may be dependent on the direction of emission or reception of a radio signal at the first transceiver. Accordingly, the orientation of the object can be determined by measuring a radio signal emitted from or one or more radio signals received by a single transceiver or tag as attached to the object.

According to an embodiment, a radio signal, in exemplary configurations an Ultra-Wideband (UWB) radio signal, received or emitted by the first transceiver as attached to the object has a signal strength dependent on the direction of emission or reception of the radio signal due to at least one of the object or parts of the object absorbing at least a part of the radio signal, one or more filters absorbing at least a part of the radio signal, and an orientation of at least one antenna with anisotropic emission or reception properties comprised in the first transceiver. Furthermore, the first transceiver may be configured for being attached to the object at one or more predetermined locations on the object, and the radiation pattern or the spatial absorption pattern may correspond to the anisotropic radiation emitted by the first transceiver as attached to the object or an attenuation of radiation received by the first transceiver as attached to the object, respectively, at a particular one of the predetermined locations on the object.

Prior art systems face the problem that the accuracy of position and orientation measurements may be impacted by reflections and absorptions from objects. Non-stationary objects such as people or other movable objects can pose an even greater problem, as they can affect the signal strength in dynamic, unpredictable ways. Typically, prior art systems try to achieve homogeneous and isotropic radiation patterns of transmitters to reach as many anchors or detectors as possible. This is one difference to the present invention, which advantageously uses anisotropic radiation and/or attenuation of a radio signal by absorption on purpose to determine an orientation of an object within radio localization applications. One aspect of the present invention is thus to facilitate the generation of an anisotropic radio signal that is non-point-symmetric or to facilitate the attenuation of a radio signal dependent on the direction of reception of a received radio signal.

In an embodiment, a first transceiver and/or one or more of the second transceivers, and the processing means are further configured for determining a position of the first transceiver. In particular, the position of the first transceiver may be determined by utilizing at least one of Two-Way Ranging (TWR), Three-Way Ranging (3WR), Time-Difference of Arrival (TDoA), Angle-of-Arrival (AoA), Phase Difference of Arrival, PDoA, and Radio Signal Strength Indicator (RSSI)-based techniques.

According to an aspect of this embodiment, an improved radio localization system is provided for determining the position and orientation of the object in a reliable and precise manner. This allows for determining the position and orientation of goods in storerooms, determining the position and orientation of products on the factory floor, during the production process, for tracking/navigation of robots/humans, for navigation of people to specific locations, e.g. in safety scenarios including an evacuation or the like, or for providing detailed statistics of soccer matches or other sports games. Similarly, the method can be employed to determine the moving direction of objects on industrial conveyor belts or automated guided vehicles (AGVs).

In an embodiment, the radio signals emitted from and/or received by the first transceiver may be Ultra-Wideband (UWB) radio signals. UWB offers several advantages. The UWB technology can use a very low energy level for short-range, high-bandwidth communications over a large portion of the radio spectrum. Further, UWB transmits in a manner that does not interfere with conventional narrow-band and carrier wave transmission in the same frequency band. Moreover, distances can be measured with a high resolution and accuracy by utilizing UWB. Further, UWB has a low interference liability. Still further, UWB signals can be coded. According to an embodiment of the present invention, UWB is thus used in combination with a radio-localization system and corresponding messages.

One aspect of the present invention is to provide an improved system that allows determining the pose of a plurality of objects, each equipped with a transmitter. Another aspect of the present invention is that the same transceiver, preferably a tag, can be used for different objects, which increases the flexibility of the radio localization system and allows for an easy adaptation to different circumstances.

The orientation of the object can be determined in real-time. Moreover, the measured characteristics may be stored and the orientation of the object may be determined based also on the stored data, for example in a post-processing step. According to an aspect of the present invention, position and orientation of the object are determined simultaneously or substantially simultaneously.

The following detailed description and accompanying drawings provide a more detailed understanding of the nature and advantages of the present invention.

BRIEF DESCRIPTION OF THE DRAWINGS

A plurality of exemplary embodiments of the invention is explained in more detail below using the accompanying figures.

DETAILED DESCRIPTION OF THE INVENTION

Described herein are systems and techniques for determining an orientation of an object. For purposes of explanation, numerous examples and specific details are set forth in order to provide a thorough understanding of the embodiments of the present invention. Embodiments as defined by the claims may include some or all of the features in these examples alone or in combination with other features described below, and may further include modifications and equivalents of the features and concepts described herein. The following description will refer to FIGS. 1 to 4 explaining embodiments of the present invention in detail.

Figure 1:
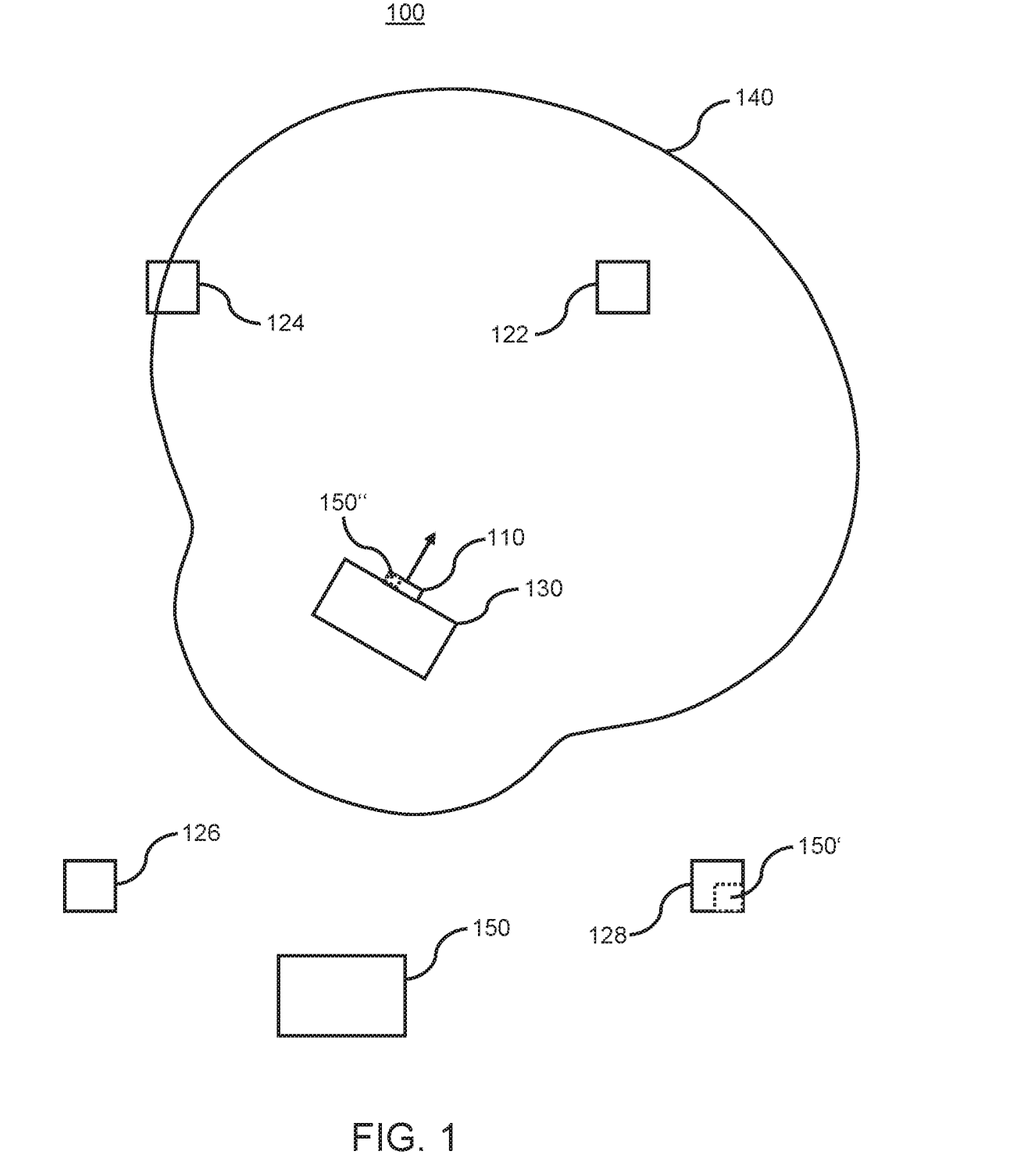
FIG. 1 shows a schematic drawing illustrating a system for determining the orientation of an object, according to an embodiment of the invention.

FIG. 1 depicts an embodiment of the present invention. In particular, FIG. 1 shows a system 100 for determining an orientation of object 130. The system 100 comprises a first transceiver 110. The first transceiver 110 may be a tag and may be configured to receive and/or emit a radio signal. The first transceiver 110 is configured to be attached to the object 130. Moreover, system 100 comprises four second transceivers 122, 124, 126 and 128. The second transceivers of FIG. 1 define a localization grid with reference positions. The reference positions correspond to the location or exact position of the second transceivers 122, 124, 126 and 128 and may be known or may be determined, for instance by the second transceivers exchanging localization messages. The second transceivers 122, 124, 126 and 128 may comprise anchor nodes and may have fixed known positions. Alternatively, the second transceivers may comprise mobile radio anchors having predetermined trajectories along which they can move. The number of four second transceivers is only an example and the number can be any number equal or higher than one. Furthermore, one or more radio signals emitted from second transceivers 122, 124, 126 and 128 may be received by the first transceiver 110. Alternatively or additionally, a radio signal emitted from the first transceiver 110 may be received by second transceivers 122, 124, 126 and 128.

According to embodiments, the first transceiver 110 may comprise and/or function as a receiver configured to receive one or more radio signals and, accordingly, the one or more second transceivers 122, 124, 126 and 128 may comprise and/or function as one or more transmitter 122, 124, 126 and 128 configured to emit one or more radio signals. For example, the first transceiver 110 may be a tag, in particular, a receiving tag, configured to receive radio signals emitted from the second transceivers 122, 124, 126 and 128, which may be radio anchors which can be configured to permanently or periodically emit radio signals.

According to a different embodiment, the first transceiver 110 may comprise and/or function as a transmitter configured to emit a radio signal and, accordingly, the second transceivers 122, 124, 126 and 128 may comprise and/or function as receivers 122, 124, 126 and 128 configured to receive the radio signal. For example, the first transceiver 110 may be a tag, this time a transmitting tag, configured to emit a radio signal, which may be received by at least one of second transceivers 122, 124, 126 and 128 comprising and/or functioning as radio anchors configured to measure one or more characteristics of received radio signals.

In the following description the term "first transceiver" denotes a component that is configured to be attached to an object and configured to emit and/or receive a radio signal, and is used interchangeably with "transmitter", "receiver" or "tag". The term "second transceivers" denotes one or more components defining a localization grid with reference positions and is used interchangeably with "transmitters", "receivers" or "radio anchors", dependent on context.

In embodiments, processing means 150' and 150" may be comprised in at least one of the first transceiver 110 and one or more second transceivers 122, 124, 126 and 128 (exemplarily illustrated in FIG. 1 for first transceiver 110 and second transceiver 128). Moreover, radio localization system 100 may comprise processing means 150 remote from the first transceiver 110 and the second transceivers 122, 124, 126 and 128. Processing means 150 may be connected wirelessly or wired to one of the first transceiver 110 and the second transceivers 122, 124, 126 and 128. Moreover, at least one of the processing means 150, 150' and/or 150" is configured to determine an orientation of the object based on a radiation pattern and/or a spatial absorption pattern associated with the first transceiver as attached to the object, and one or more measured characteristics of radio signals received at the first transceiver and/or the second transceivers.

FIG. 1 will now be explained in more detail according to an embodiment, where the first transceiver 110 functions as a transmitter and the second transceivers 122, 124, 126 and 128 function as receivers. The system 100 comprises transmitter 110. The transmitter 110 may be a first transceiver or a tag and is configured to emit a radio signal. The transmitter 110 is attached to the object 130. The transmitter may be in contact with the object, may be installed on the object, may be physically or logically connected to the object, may be fixed on the object, or may be mounted on the object. Alternative solutions to attach the transmitter to the object or to spatially associate the transmitter with the object are possible. Furthermore, an object may be placed at certain defined locations or slots relative to an associated transmitter, e.g. within a factory floor environment. Further, the transmitter 130 may be attached to a surface, a side, an opening, a slot, or a cavity of an object. Alternative locations on or in the object are possible. The exact position of the transmitter may be known in relation to the object. For example, the transmitter 110 may be connected and/or attached to one side of the object 130.

Further, the transmitter 110 may be attached to the object 130 such that a change in the orientation of the object 130 also results in a corresponding change in the orientation of the transmitter 110 or tag. For example, if the object 130 rotates around an axis, the transmitter 110 or tag rotates around the same axis. Moreover, the transmitter 110 may be an actively transmitting tag.

The object 130 may be not fully transparent to electromagnetic waves. Accordingly, the object 130 or at least a part of the object 130 absorbs at least a part of the radio signal emitted from the transmitter 110. Therefore, anisotropic radiation emitted by the transmitter 110 as attached to the object 130 propagates through space. Moreover, one or more characteristics, e.g. the signal strength, of a radio signal emitted by the first transceiver 110 as attached to the object 130 may be dependent on an angle of departure of the emitted radio signal. The anisotropic radiation is indicated via contour line 140. The contour line 140 indicates points of same signal strength of the radio signal emitted from the transmitter 110 as attached to the object 130.

According to one embodiment, the transmitter 110 itself emits an anisotropic radio signal. In this case, the transmitter 110 may comprise one or more specific antennas, each with anisotropic radiation properties, or an arrangement of antennas providing for an anisotropic or non-point-symmetric radiation emitted and propagated in space. Still further, a housing of the transmitter or parts of the transmitter other than the antenna(s) and/or transceiver may provide for substantial deviation from a point-symmetric radiation pattern. This non-point-symmetric radiation pattern of the transmitter may additionally be altered by at least partial absorption of electromagnetic waves by the object. Alternatively or additionally, one or more filters configured to absorb at least a part of the radio signal may also be applied to provide for the desired effect of providing for a specific anisotropic radiation. The filtering can be performed by using one or more filters that absorb a portion of the emitted radio signal. Moreover, the object 130 can be used to filter at least a portion of the radio signal.

In embodiments, the object may be a person, like an ice hockey player, a soccer player, a visitor in a museum or any other person. Tags can be attached to the upper back/shoulder area of sports players, like hockey or soccer players. Hence, virtually no or little radiation is emitted in a "forward" direction. Accordingly, anchors (receivers) in front of the player only receive a weak signal or none at all. As the position of the anchor is known, it is possible to tell in which direction the player is (not) facing. According to other embodiments, the object can be any kind of equipment, like a helmet or a go-cart. According to further embodiments, the object can be a product, a device, or an AGV.

The object can move through space. In particular, the object can move on a conveyor belt trajectory, a two-dimensional plane, like a playing field, or in three dimensional space, but with certain known limitations. Accordingly, the object may have one, two or more degrees of freedom. In certain other applications the object may not be limited in its movement and thus move freely through space.

Turning back to FIG. 1, system 100 comprises four receivers 122, 124, 126 and 128. The receivers 122, 124, 126 and 128 are configured to receive the anisotropic radio signal emitted from the transmitter 110. Further, the receivers 122, 124, 126 and 128 may comprise anchor nodes, which may have a fixed location. Moreover, the location or exact position of the receivers 122, 124, 126 and 128 can be known or may be determined, for instance by the receivers exchanging localization messages. The number of four receivers is only an example and the number can be any number equal or higher than one. Furthermore, the location of the one or more receivers can be chosen as desired, but in a distance close enough to the transmitter so that one or more receivers may be able to detect the radio signal with sufficient signal strength. Moreover, the one or more receivers each have a different position outside of and/or separate from the object 130 and the transmitter 110. Further, according to an embodiment, the radio localization system comprises two or more receivers and at least two receivers of the two or more receivers are arranged to not form a straight line with the object, according to predefined movement of the object. Accordingly, at least two receivers of the two or more receivers have a different angle with respect to an orientation of the object.

The reliability of the orientation determination can be increased by increasing the number of receivers. A high number of receivers results in a more reliable estimation of the orientation compared to a small number of receivers (for example, one or two). Moreover, the measurement quality can be increased by choosing a location for the receivers not too close to the transmitter to make use of the anisotropic character of the radio signal and not too far away from the transmitter to receive a detectable signal with a sufficient signal to noise ratio, SNR. For example, the distance between the transmitter and the receiver may be less than 0.5 to 10 meters, in the order of 1 to 100 meters or in the order of 5 to 1000 meters.

As indicated by the contour line 140, the radiation pattern of the radio signal is anisotropic and non-point-symmetric. The radiation pattern can have any shape that is anisotropic and wherein at least one receiver receives a portion of the anisotropic radiation characteristic.

The radio localization system 100 further comprises processing means 150, processing means 150' included in receiver 128 (or all receivers) and/or processing means 150" included in transmitter/tag 110. The processing means 150, 150' and/or 150" may comprise one or more processors. Furthermore, the processing means may be comprised in an electronic device. The processing means or the electronic device may comprise a computer, a mobile phone, a Smartphone, a tablet computer, a notebook computer, a wearable device, etc. The processing means can be connected to the one or more receivers to process the radio signal and/or the radio signal characteristics measured by the one or more receivers. The processing means may be connected wirelessly or wired to the one or more receivers. Specifically, the processing means are configured to determine an orientation of the object based on the received anisotropic radio signal and a radiation pattern. This is explained below in more detail with respect to FIGS. 3A to 3D.

The receiver can be used to determine or estimate also the position of the transmitter. The position of an actively transmitting tag may be estimated by utilizing methods like Two-Way Ranging (TWR), Three-Way Ranging (3WR), Time-Difference of Arrival (TDoA), Angle-of-Arrival (AoA), Phase Difference of Arrival, PDoA, and RSSI-based techniques.

According to an embodiment, the determination of the orientation is performed after the localization of the transmitter 110. According to another embodiment, the determination of the orientation is performed without determining the location of the transmitter 110. According to another embodiment, the determination of the orientation is performed substantially simultaneously with the localization of the transmitter 110.

In an embodiment it is required that the transmitter 110 and the receivers 122, 124, 126 and 128 exchange signals to determine the exact position or location of the transmitter 110, e.g. when performing Two-Way Ranging (TWR). According to this embodiment, the transmitter 110 is a first transceiver configured for receiving and emitting radio signals, and the receivers 122, 124, 126 and 128 are second transceivers configured for receiving and emitting radio signals. According to embodiments, the first transceiver comprises one or more features of the transmitter as described herein above or below. Moreover, the second transceivers may comprise one or more features of the receivers as described herein above or below.

According to an embodiment, a spatial absorption pattern associated with the first transceiver 110 as attached to the object 130 may have a known, determined, measured or estimated absorption characteristic. The spatial absorption pattern may correspond to an attenuation of radiation received by the first transceiver 110 as attached to the object 130. Moreover, the spatial absorption pattern may be derived from an anisotropic radiation pattern associated with the first transceiver 110 as attached to the object 130 and indicated via contour line 140. For example, the spatial absorption pattern may be inverse to the radiation pattern. The first transceiver 110 may measure a signal strength that depends on the direction of reception of a received radio signal at the first transceiver as attached to the object 130. The object being in the line of sight between the first transceiver and a second transceiver may cause attenuation of one or more characteristics of a radio signal emitted from the second transceiver. Therefore, the one or more measured characteristics are dependent on the orientation of the object to which the first transceiver 110 is attached, e.g. at one side of the object. The same effect of an attenuation of a signal characteristic of a radio signal dependent on the direction of reception can be achieved by employing one or more filters absorbing at least a part of the one or more radio signals and/or by comprising at least one antenna with anisotropic reception properties in the first transceiver 110. The filters may be comprised in the first transceiver or the object.

A spatial absorption pattern associated with the first transceiver 110 as attached to the object 130 may correspond or may at least be transformable to a radiation pattern associated with the same first transceiver 110 as attached to the same object 130. Both, a spatial absorption pattern and a radiation pattern may correspond to or may be derived from an equipotential line corresponding to contour line 140. Moreover, a spatial absorption pattern and a radiation pattern may be derived from each other, since the spatial absorption pattern may be proportional to the inverse radiation pattern. For example, the signal strength of a radio signal detected or measured at the first transceiver as attached to the object may depend on the orientation of the object and a corresponding absorption or attenuation of at least a part of the received radio signal. The spatial absorption pattern may comprise an attenuation pattern or may correspond to an extrapolated equipotential line. The spatial absorption pattern may be known, estimated or determined by simulation or calibration. Further, the spatial absorption pattern may define an attenuation of signal characteristics for different directions of reception of the radio signal at the second transceiver as attached to the object. Moreover, the spatial absorption pattern may allow comparing values corresponding to an assumed orientation of the object with values measured at one or more of the second transceivers. At least one of the values may be interpolated or extrapolated for the comparison of the values.

Figure 2:
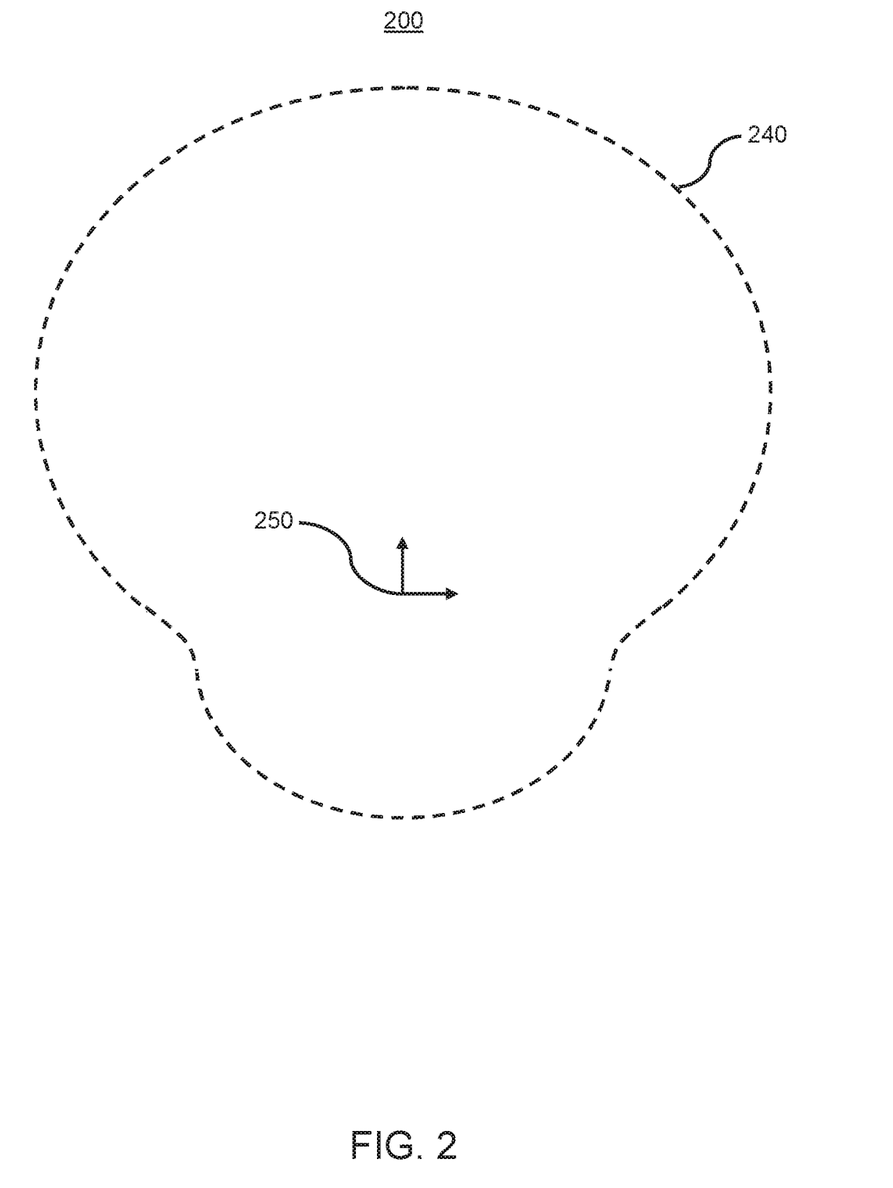
FIG. 2 shows a radiation pattern of an anisotropic radio signal that can be used to determine the orientation of an object, according to an embodiment of the invention.

FIG. 2 shows a contour line/equipotential line 240 of an exemplary radiation pattern being associated with transmitter 110 as attached to the object 130 of FIG. 1. The radiation pattern may be called object radiation pattern. The transmitter 110 as being attached to the object 130 may also be called the tracked object comprising the transmitter 110 and the object 130. The radiation pattern may be a known radiation pattern. The known radiation pattern of the tracked object may be estimated or determined based on at least one of a simulation of the emitted anisotropic radiation with respect to the transmitter 110 as attached to the object 130, a calibration of the receivers or the transmitter, a reference measurement at certain positions and orientations of the tracked object, and a measurement of the radiation pattern of the tracked object.

Accordingly, the known radiation pattern 240 has a known origin 250 and for purposes of illustration corresponds to the emitted radiation pattern 140 of FIG. 1. The origin 250 corresponds to the location of the tag or transceiver. The coordinate system with the origin 250 in FIG. 2 indicates the orientation of the known radiation pattern 240. If an orientation of the known radiation pattern 240 matches with the measured characteristics of the received radio signal, the orientation of the object can be determined by a coordinate transformation, since the relationship between said orientation of the known radiation pattern and the orientation of the object is known. Due to the anisotropic characteristic of the emitted radiation, only one orientation of the known radiation pattern may correspond to the measured characteristics of the anisotropic radiation.

Figure 3A:
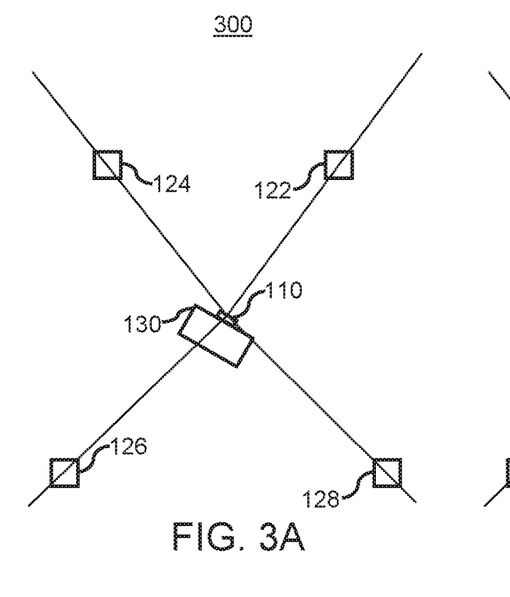
FIGS. 3A-3D are schematic drawings illustrating a system and technique for determining the orientation of an object, according to embodiments of the invention.

FIGS. 3A to 3D display a system 300 for determining an orientation and a position of an object according to an embodiment of the present invention. The system 300 comprises a transmitter 110 attached to object 130. The transmitter 110 emits a radio signal. As indicated in FIG. 3A, the radio signal may be propagated to and detected by receivers 122, 124, 126 and 128. The four receivers 122, 124, 126, 128 measure one or more characteristics of the received radio signal.

Moreover, the localization system 300 may be configured by utilizing at least two receivers of the receivers 122, 124, 126 and 128 to determine a position of the transmitter 110. As already explained, the position of an actively transmitting tag may be estimated by utilizing at least one of methods like Two-Way Ranging (TWR), Three-Way Ranging (3WR), Time-Difference of Arrival (TDoA), Angle-of-Arrival (AoA), Phase Difference of Arrival, PDoA, and RSSI-based techniques. Alternatively, other methods may be used to determine the exact position of the tag.

Figure 3B:
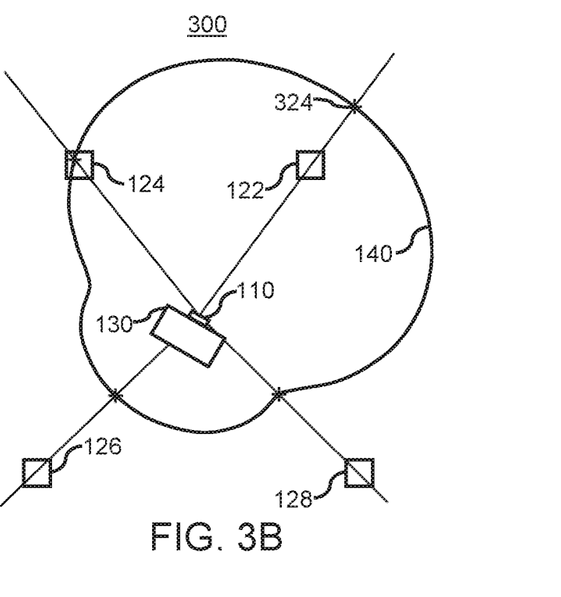

The transmitter 110 as attached to object 130 emits anisotropic radiation, which is indicated in FIG. 3B by contour line 140 corresponding to a line with the same radio signal strength of the emitted radiation. The radio signal from tag 110 can be detected by the receivers 122, 124, 126 and 128. However, not all sensors may detect the signal. For example, as indicated by the contour line 140, the signal strength is different for the receivers 122, 124, 126 and 128, and depends on the anisotropic nature of the emitted radio signal and/or the distance between the transmitter and the respective receiver. With respect to FIG. 3B, receivers 122 and 124 measure a signal strength that is higher than the radio signal strength at the contour line 140 and receivers 126 and 128 measure a signal strength that is lower than the radio signal strength at the contour line 140. The radio signal strength at receivers 126 and 128 may even be too weak to be detected by a receiver in a reliable manner.

Figure 3C:
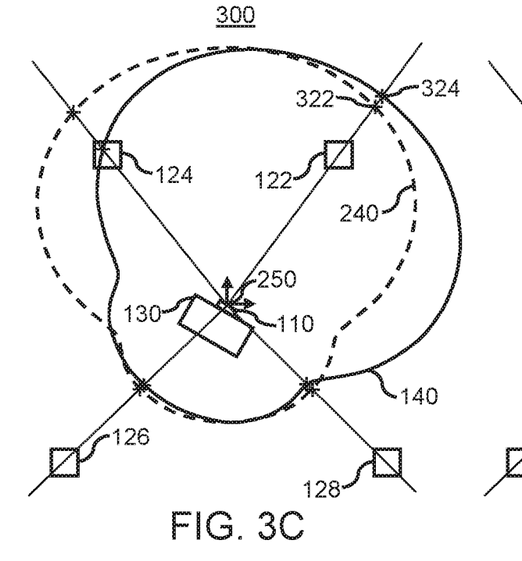
Figure 3D:
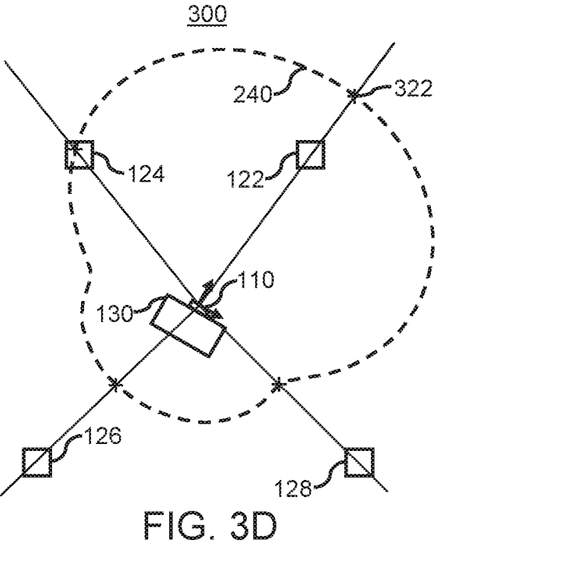

After determining the position of the tag 110, the known radiation pattern corresponding to contour line 240 can be used to determine the orientation of the object 130 with the attached transmitter 110 as shown in FIGS. 3C and 3D.

A technique according to an exemplary embodiment is shown in FIG. 3C. The known radiation pattern with the origin 250 is illustrated overlaid with the detected position of the tag 110. The known or expected radiation pattern 240 is rotated around the origin 250 until values corresponding to the known or expected radiation pattern 240 best match values corresponding to the one or more characteristics measured at the receivers. The orientation and position of the tag on the object (to which side of the object 130 the tag 110 is attached to) is known and thus the orientation of the object can be determined. The one or more characteristic may comprise a radio signal strength of the radio signal.

In embodiments, the position of the transmitter is known, can be determined from radio localization measurements or is provided from a different system. Further, the position of the one or more receivers is known or can be determined from a measurement. Alternatively, the position of the receivers may be determined with respect to the position of one receiver of the receivers. Accordingly, a distance between the transmitter and each of the one or more receivers can be determined. These one or more distances can be used to compare values corresponding to the measured one or more characteristics at each of the one or more receivers with values corresponding to an orientation of the known radiation pattern. The values corresponding to the measured one or more characteristics at each of the one or more receivers may comprise radio signal strength measured at each of the one or more receivers.

The values corresponding to an orientation of the known radiation pattern may be values that are derived from the known radiation pattern for different angles of rotation around the origin of the known radiation pattern. Since the position of the transmitter and all receivers is known or can be determined, the angles between the orientation of the radiation pattern and the line-of-sight to each of the receivers can be determined. The values corresponding to the measured one or more characteristics may be a first set of values. The values corresponding to an orientation of the known radiation pattern may be a second set of values.

In an embodiment, the values corresponding to an orientation of the known radiation pattern may be interpolated to allow for a comparison with the values corresponding to the measured one or more characteristics. In another embodiment, the values corresponding to the measured one or more characteristics may be extrapolated and/or interpolated to allow for a comparison with the values corresponding to an orientation of the known radiation pattern. In a further embodiment, the values corresponding to an orientation of the known radiation pattern may be interpolated and the values corresponding to the measured one or more characteristics may be extrapolated to allow for a comparison between the values corresponding to an orientation of the known radiation pattern and the values corresponding to the measured one or more characteristics.

According to embodiments, an assumed orientation of the object 130 is utilized for determining an orientation of the object 130. The assumed orientation of the object may correspond to an orientation of the radiation pattern and/or the spatial absorption pattern. A change in the assumed orientation of the object corresponds to a change in the orientation of the radiation pattern and spatial absorption pattern. Accordingly, values determined based on a radiation pattern and/or a spatial absorption pattern for a specific assumed orientation differ from values determined for other assumed orientations of the object 130.

Further, by utilizing at least one of Iterative Closest Point (ICP), a shape matching algorithm, principle component analysis, PCA, and singular-value decomposition, SVD, values corresponding to an orientation of the known radiation pattern can be compared with values corresponding to the measured one or more characteristics to determine the orientation of the object 130.

As depicted exemplarily in FIG. 3C, point 322 is comprised in the second set of values and point 324 is comprised in the first set of values. Point 322 (intersection of contour line 240 and line from transmitter 110 through receiver 122) indicates a value corresponding to a specific orientation of the known radiation pattern on a line with the receiver 122 and the position of the transmitter 110 (corresponding to the origin 250 of the radiation pattern 240). The value may be extrapolated and/or interpolated, so that the value corresponds to contour line 240. Point 324 (intersection of contour line 140 and line from transmitter 110 through receiver 122) indicates a value corresponding to the measured one or more characteristics at receiver 122. The value may be extrapolated and/or interpolated, so that the value corresponds to contour line 140.

In the exemplarily embodiment shown in FIG. 3C and FIG. 3D, the values that are compared with each other may be distances. The distances may be estimated based on the radio signal strength measured at a respective receiver and the distance between the respective receiver and the transmitter. Since the decline of the signal strength over a distance is known, by measuring the radio signal strength at the position of a receiver a distance from the transmitter may be estimated along the straight line defined by the position of the transmitter and the position of the receiver, where the radio signal strength has a particular measured value. For example, with regard to FIG. 3C, at the estimated distances (intersection between the four straight lines, defined by the position of the transmitter 110 and the positions of the respective receivers 122, 124, 126 and 128, and contour line 140) the radio signal strength corresponds to the radio signal strength at contour line 140.

Alternatively, according to other embodiments, the values that are compared with each other may be the radio signal strength at one or more particular distances interpolated from the radiation pattern 240 and/or extrapolated from the measured signal strength at each receiver. For example, the one or more particular distances may be the distance from the origin to the positions of each of the receivers 122, 124, 126 and 128, one distance that is equally far away from the transmitter, or any distance along the lines from the transmitter 110 through each of the receivers 122, 124, 126 and 128.

As apparent from FIG. 3C, the distances calculated from the one or more characteristics (the signal strength) do not match the distances estimated from the radiation pattern 240 for the orientation of the radiation pattern 240 (see difference between 322 and 324). Accordingly, the orientation of the radiation pattern 240 also does not match the orientation of the emitted radiation pattern 140.

The second set of values is varied by varying the orientation of the known radiation pattern 240 until the first set of values best matches the second set of values. The values (the first set of values and the second set of values) are compared with each other for different positions and/or orientations of the known radiation pattern 240. In this example, radiation pattern 240 is rotated to the position as depicted in FIG. 3D.

In FIG. 3D, the values (the first set of values and/or the second set of values) are estimated for the new orientation of the known radiation pattern 240. The comparison between the first set of values and the second set of values results in a best match between the two sets. Thus, the orientation of the known radiation pattern 240 corresponds to the orientation of the emitted radiation pattern 140 (not shown in FIG. 3D). From the orientation of the radiation pattern 240, the orientation of the object can be derived, since the relationship between the orientation of the radiation pattern and the orientation of the object is known or predetermined. Accordingly, the orientation of the object 130 can be determined.

By comparison/matching the received radio signal strength measurements, one can determine the received radiation pattern through variation of rotation with the expected signal reception pattern gained from the known object radiation pattern and its estimated location, e.g. utilizing Iterative Closest Point (ICP), shape matching algorithms, principal component analysis (PCA) and/or singular value decomposition (SVD) methods, so that the pose of the object can be fully determined.

Figure 4:
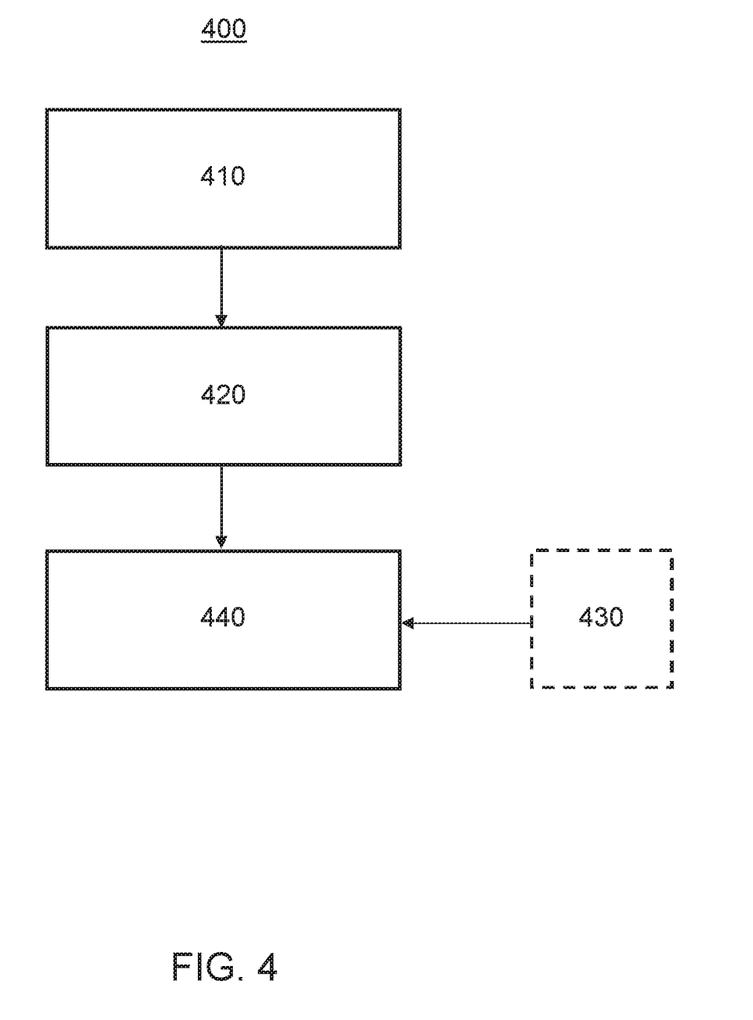
FIG. 4 shows a flow diagram illustrating a method for determining an orientation of an object, according to an embodiment of the invention.

FIG. 4 shows a flow diagram illustrating a method 400 for determining an orientation of an object, according to an embodiment of the invention. The method comprises, in step 410, receiving, by a first transceiver, a radio signal emitted from a second transceiver of one or more second transceivers and/or receiving, by a second transceiver of the one or more second transceivers, a radio signal emitted from the first transceiver, wherein the one or more second transceivers define a localization grid with reference positions and the first transceiver is attached to an object. Each of the second transceivers may be positioned at a different position remote from the object and the first transceiver.

In an embodiment, each of a plurality of second transceivers emits a radio signal at different times or not at substantially the same time, wherein these radio signals are used for the orientation determination. The radio signals emitted from second transceivers at different times may comprise a time stamp and/or identification of respective emitting second transceivers. Radio signals emitted from second transceivers and received by the first transceiver may be used to identify respective second transceivers based on the time stamp and/or identification. Alternatively or additionally, the first transceiver and the second transceivers comprise synchronized clocks and the radio signals emitted from second transceivers may be emitted at specific times corresponding to expected time slots to identify the second transceivers.

According to an embodiment, the first transceiver comprises a transmitter emitting an anisotropic radio signal by means of one or more antennas with anisotropic characteristics. The object may still absorb at least a part of the radio signal. An anisotropic radio signal may be generated by at least one of the transmitter emitting an anisotropic signal and the transmitter emitting an isotropic signal that is altered to an anisotropic radio signal by at least partial absorption of the isotropic radio signal by the object.

According to a step 420 one or more characteristics of the received radio signal are measured at each of the one or more second transceivers or the first transceiver, respectively. A position of the first transceiver is determined or received at optional step 430. The position may be measured by two or more second transceivers and/or provided by a different system or device. The different system may be a localization system configured to determine the position of the object. Alternatively, the different system or device may comprise a storage medium that stores positions of the object.

According to step 440 of method 400, an orientation of the object 130 is determined based on a radiation pattern and/or a spatial absorption pattern associated with the first transceiver as attached to the object, and the one or more measured characteristics of the received radio signal. In an embodiment, the orientation of the object is determined based on a radiation pattern 240, corresponding to anisotropic radiation emitted by the first transceiver as attached to the object, and the measured one or more characteristics. Step 440 may comprise comparing values determined from the measured one or more characteristics with values determined from the known radiation pattern. This comparison can be performed by several computing algorithms. For example, principal component analysis (PCA) and/or singular value decomposition (SVD) may be utilized.

In one embodiment, a relatively high number of receivers may be used to determine the orientation of an object. A high number/density of receivers allows determining the orientation of the object without calculating the exact position of the transmitter. For example, if the transmitter emits a highly anisotropic radio signal with a maximum peak in the direction of the orientation of the object and no radiation in the opposite direction and if this peak is detected by, for example, a predefined number of spatially adjacent receivers, for instance two or three receivers located in close vicinity to each other, but not by other receivers located remote from these receivers, it is possible to determine the orientation of the object without determining its position. Moreover, the distance to the transmitter and/or its position may be determined with the received signal strength and/or a received radio signal strength indicator, RSSI. For example, the distance between a tag and a receiver can be approximated based on the relationship between transmitted and received signal strength.

According to embodiments of the present invention, metrics received at the transceiver of one or more radio anchors allow for determination of the orientation of an emitting transceiver associated with a movable object and hence for the determination of the orientation of the object itself. Further, according to embodiments of the present invention a tracking system is provided for determining a position and orientation of a tracked object substantially simultaneously based on an object radiation pattern. To determine the object orientation, a known/estimated natural or artificial anisotropic, non-point-symmetric radiation pattern is utilized. Radiolocation methods (e.g. time of flight or RSSI) are utilized for position estimation and signal characteristics (e.g. first-path RSSI) are utilized for the determination of the orientation of the object. This may be performed substantially simultaneously to determine at substantially the same time the position and orientation of an object.

As explained above, pure radiolocation measurements in accordance with the present invention, without the need for additional sensors for determining the orientation of the object, provide for several advantages, including a reliable determination of an orientation of a tracked object at less complexity and costs of the transmitter on or at the movable object.

The invention claimed is:

1. A radio localization system for determining an orientation of an object, the radio localization system comprising:
a first transceiver configured for being attached to an object;
a plurality of second transceivers defining a localization grid with reference positions,
wherein the first transceiver is configured for emitting a radio signal, and wherein the plurality of second transceivers are configured for measuring one or more characteristics of a radio signal received from the first transceiver; or
wherein the plurality of second transceivers are configured for emitting one or more radio signals, and wherein the first transceiver is configured for measuring one or more characteristics of a radio signal received from a second transceiver; and
processing means configured for determining an orientation of the object based on a radiation pattern associated with the first transceiver as attached to the object and/or a spatial absorption pattern associated with the first transceiver as attached to the object, and one or more measured characteristics of one or more received radio signals.

2. The radio localization system of claim 1, wherein the processing means is configured for determining the orientation of the object by comparing values corresponding to an assumed orientation of the object with values corresponding to the one or more measured characteristics.

3. The radio localization system of claim 1, wherein the first transceiver and/or one or more of the second transceivers, and the processing means are further configured for determining a position of the first transceiver.

4. The radio localization system of claim 3, wherein the position of the first transceiver is determined by utilizing at least one of Two-Way Ranging, TWR, Three-Way Ranging, 3WR, Time-Difference of Arrival, TDoA, Angle-of-Arrival, AoA, Phase Difference of Arrival, PDoA, and radio signal strength indicator, RSSI,-based techniques.

5. The radio localization system of claim 1, wherein the processing means is configured for determining the orientation of the object by comparing a first set of values with a second set of values, the first set of values being determined from at least the one or more measured characteristics, and the second set of values being determined from at least the radiation pattern having a known or estimated radiation characteristic and/or from at least the spatial absorption pattern having a known or estimated absorption characteristic, wherein at least one value of the first set of values and the second set of values is extrapolated and/or interpolated for the comparison, and wherein the second set of values is varied by rotating an orientation of the radiation pattern and/or by rotating an orientation of the spatial absorption pattern until the first set of values best matches the second set of values.

6. The radio localization system of claim 1, wherein the first transceiver at least one of:
is configured for being attached to the object at one or more predetermined locations on the object, and wherein the radiation pattern corresponds to anisotropic radiation emitted by the first transceiver as attached to the object at a particular one of the predetermined locations on the object and/or the spatial absorption pattern corresponds to an attenuation of radiation received by the first transceiver as attached to the object at a particular one of the predetermined locations on the object; and
comprises one or more antennas being configured for emitting or receiving, with an anisotropic characteristic, radio signals.

7. The radio localization system of claim 1, wherein the plurality of second transceivers at least one of:
have known positions;
comprise two or three second transceivers; and
are configured for determining the position of each of the plurality of second transceivers.

8. The radio localization system of claim 1, wherein the processing means is configured for determining the orientation of the object by comparing values corresponding to the radiation pattern or the spatial absorption pattern with values corresponding to the one or more measured characteristics by utilizing at least one of Iterative Closest Point, ICP, a shape matching algorithm, principle component analysis, PCA, and singular-value decomposition, SVD.

9. The radio localization system of claim 1, wherein the radiation pattern and/or the spatial absorption pattern is determined by at least one of:
an estimate;
a simulation of one or more radio signals emitted and/or received by the first transceiver as attached to the object;
a calibration of the first transceiver as attached to the object;
a calibration of the plurality of second transceivers, by measuring one or more characteristics of radio signals received from and/or sent to the first transceiver at known positions and orientations of the first transceiver as attached to the object; and
a measurement of one or more radio signals emitted or received by the first transceiver as attached to the object.

10. The radio localization system of claim 1, wherein the first transceiver comprises a tag, and/or wherein the plurality of second transceivers comprise fixed radio anchors or mobile radio anchors having predetermined trajectories.

11. A method for determining an orientation of an object, the method comprising:
receiving, by a first transceiver, a radio signal emitted from a second transceiver of a plurality of second transceivers and/or receiving, by a second transceiver of the plurality of second transceivers, a radio signal emitted from the first transceiver,
wherein the plurality of second transceivers define a localization grid with reference positions and the first transceiver is attached to an object;
measuring one or more characteristics of the received radio signal; and
determining an orientation of the object based on a radiation pattern associated with the first transceiver as attached to the object and/or a spatial absorption pattern associated with the first transceiver as attached to the object, and the one or more measured characteristics of the received radio signal.

12. The method of claim 11, wherein the determining an orientation of the object comprises determining the orientation of the object by comparing values corresponding to an assumed orientation of the object with values corresponding to the one or more measured characteristics.

13. The method of claim 11, wherein the method further comprises at least one of receiving a position of the first transceiver and determining a position of the first transceiver.

14. The method of claim 11, wherein the one or more characteristics comprise a radio signal strength or radio signal strength indicator, RSSI, wherein determining the orientation of the object comprises comparing a first set of values with a second set of values, the first set of values being determined from at least the one or more measured characteristics, and the second set of values being determined from at least the radiation pattern having a known or estimated radiation characteristic or from at least the spatial absorption pattern having a known or estimated absorption characteristic, wherein at least one of the first set of values and the second set of values is interpolated for the comparison, and wherein the second set of values is varied by rotating an orientation of the radiation pattern and/or by rotating an orientation of the spatial absorption pattern until the first set of values best matches the second set of values.

15. The method of claim 11, wherein the radio signal emitted or received by the first transceiver as attached to the object at least one of:
has a signal strength dependent on the direction of emission or reception of the radio signal due to the object or parts of the object absorbing at least a part of the radio signal;
has a signal strength dependent on the direction of emission or reception of the radio signal due to one or more filters absorbing at least a part of the radio signal;
has a signal strength dependent on the direction of emission or reception of the radio signal due to an orientation of at least one antenna with anisotropic emission or reception properties comprised in the first transceiver; and
comprises an Ultra-Wideband, UWB, radio signal.

16. An electronic device comprising one or more processors, the electronic device being configured to perform operations to determine an orientation of an object in a radio localization system, the operations comprising:
receiving one or more measured characteristics of a radio signal, the radio signal having been (a) emitted by one of a plurality of second transceivers and received by a first transceiver attached to an object or (b) emitted by the first transceiver and received by one of the plurality of second transceivers, the plurality of second transceivers defining a localization grid with reference positions; and
determining an orientation of the object based on a radiation pattern associated with the first transceiver as attached to the object and/or a spatial absorption pattern associated with the first transceiver as attached to the object, and the one or more measured characteristics of the radio signal.

17. The electronic device of claim 16, wherein the determining an orientation of the object comprises determining the orientation of the object by comparing values corresponding to an assumed orientation of the object with values corresponding to the one or more measured characteristics.

18. The electronic device of claim 16, wherein the operations further comprise at least one of receiving a position of the first transceiver and determining a position of the first transceiver.

19. The electronic device of claim 16, wherein the one or more characteristics comprise a radio signal strength or radio signal strength indicator, RSSI, wherein determining the orientation of the object comprises comparing a first set of values with a second set of values, the first set of values being determined from at least the one or more measured characteristics, and the second set of values being determined from at least the radiation pattern having a known or estimated radiation characteristic or from at least the spatial absorption pattern having a known or estimated absorption characteristic, wherein at least one of the first set of values and the second set of values is interpolated for the comparison, and wherein the second set of values is varied by rotating an orientation of the radiation pattern and/or by rotating an orientation of the spatial absorption pattern until the first set of values best matches the second set of values.

20. The electronic device of claim 16, wherein the radio signal:
has a signal strength dependent on the direction of emission or reception of the radio signal due to the object or parts of the object absorbing at least a part of the radio signal;
has a signal strength dependent on the direction of emission or reception of the radio signal due to one or more filters absorbing at least a part of the radio signal;
has a signal strength dependent on the direction of emission or reception of the radio signal due to an orientation of at least one antenna with anisotropic emission or reception properties comprised in the first transceiver; and/or
comprises an Ultra-Wideband, UWB, radio signal.

* * * * *